United States Patent
Powell et al.

(10) Patent No.: US 10,007,565 B1
(45) Date of Patent: *Jun. 26, 2018

(54) DYNAMIC DEEP LINKS TO TARGETS

(71) Applicant: Google Inc., Mountain View, CA (US)

(72) Inventors: Adam William Powell, Los Altos, CA (US); Neel Rao, San Francisco, CA (US); Benjamin David Poiesz, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/278,954

(22) Filed: Sep. 28, 2016

Related U.S. Application Data

(63) Continuation of application No. 14/988,218, filed on Jan. 5, 2016, now Pat. No. 9,465,682.

(60) Provisional application No. 62/167,074, filed on May 27, 2015.

(51) Int. Cl.
  *G06F 9/54* (2006.01)
  *G06F 3/0482* (2013.01)
  *G06F 3/0488* (2013.01)
  *G06F 3/01* (2006.01)
  *G06F 17/22* (2006.01)

(52) U.S. Cl.
  CPC .............. *G06F 9/543* (2013.01); *G06F 3/016* (2013.01); *G06F 3/0482* (2013.01); *G06F 3/04883* (2013.01); *G06F 17/2235* (2013.01)

(58) Field of Classification Search
  CPC ... G06F 9/45512; G06Q 10/10; G06Q 10/107
  USPC .................................. 719/320; 715/752, 753
  See application file for complete search history.

(56) References Cited

U.S. PATENT DOCUMENTS

| | | |
|---|---|---|
| 8,326,835 B1 | 12/2012 | Munter |
| 8,510,764 B1 | 8/2013 | Deselaers et al. |
| 8,910,240 B1 | 12/2014 | Hamilton et al. |
| 9,251,508 B2 | 2/2016 | Bishop |
| 2015/0033102 A1 | 1/2015 | Losvik et al. |

OTHER PUBLICATIONS

Notice of Allowance from U.S. Appl. No. 14/988,218, dated Jun. 7, 2016 9 pgs.
U.S. Appl. No. 14/988,218, filed Jan. 5, 2016 by Adam William Powell et al.

*Primary Examiner* — Andy Ho
(74) *Attorney, Agent, or Firm* — Shumaker & Sieffert, P.A.

(57) ABSTRACT

A computing device may receive from a first application executing on at least one processor an indication of an action to be performed. The computing device may determine, based on at least the indication of the action to be performed, a plurality of deep links to a plurality of actions performable by a plurality of applications. The computing device may select a subset of deep links from the plurality of deep links. The computing device may output for display a graphical user interface including an indication of each deep link from the subset of deep links. The computing device may receive an indication of a user input, the user input corresponding to a selection of one of the deep links from the subset of deep links. A second application executing on the at least one processor may perform an action linked to by the selected deep link.

26 Claims, 4 Drawing Sheets

DYNAMIC DEEP LINKS TO TARGETS

RELATED APPLICATION

This application is a continuation of U.S. patent application Ser. No. 14/988,218, filed Jan. 5, 2016 and issued as U.S. Pat. No. 9,465,682 on Oct. 11, 2016, which claims the benefit of U.S. Provisional Patent Application No. 62/167,074, filed May 27, 2015, the entire content of which is hereby incorporated by reference.

BACKGROUND

A foreground application running on a computing device may sometimes interact with other applications running on the computing device. The foreground application may, for example, broadcast an indication of an action be performed that may be serviced by another application running on the computing device. A service on the computing device may determine the other applications running on the computing device that are most relevant to the broadcasted indication of the action to be performed and may enable a user to select, from within the foreground application, the application that services the indicated action. For example, the foreground application may broadcast an indication of an intent by the foreground application to share a piece of data, and the service running on the computing device may determine the relevant applications installed at the computing device and available for execution by the computing device to which the foreground application is able to share the piece of data. The service may enable the user to select the application to which the foreground application shares the piece of data.

SUMMARY

In one aspect, the disclosure is directed to a method. The method includes receiving, by at least one processor from a first application executing on the at least one processor, an indication of an action to be performed. The method further includes determining, by the at least one processor and based on at least the indication of the action to be performed, a plurality of deep links to a plurality of actions performable by a plurality of applications. The method further includes selecting, by the at least one processor, a subset of deep links from the plurality of deep links. The method further includes outputting, by the at least one processor and for display, a graphical user interface including an indication of each deep link from the subset of deep links. The method further includes receiving, by the at least one processor, an indication of a user input, the user input corresponding to a selection of one of the deep links from the subset of deep links. The method further includes performing, by a second application executing on the at least one processor, an action linked to by the selected deep link.

In another aspect, the disclosure is directed to a computing device. The computing device includes a memory. The computing device further includes at least one processor configured to: receive from a first application executing on the at least one processor an indication of an action to be performed; determine, based on at least the indication of the action to be performed, a plurality of deep links to a plurality of actions performable by a plurality of applications; select a subset of deep links from the plurality of deep links; output for display a graphical user interface including an indication of each deep link from the subset of deep links; receive an indication of a user input, the user input corresponding to a selection of one of the deep links from the subset of deep links; and perform, by a second application executing on the at least one processor, an action linked to by the selected deep link.

In another aspect, the disclosure is directed to a non-transitory computer readable medium encoded with instructions. The instructions, when executed, cause one or more processors of a computing device to: receive from a first application an indication of an action to be performed; determine, based on at least the indication of the action to be performed, a plurality of deep links to a plurality of actions performable by a plurality of applications; select a subset of deep links from the plurality of deep links; output for display a graphical user interface including an indication of each deep link from the subset of deep links; receive an indication of a user input, the user input corresponding to a selection of one of the deep links from the subset of deep links; and perform, by a second application, an action linked to by the selected deep link The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
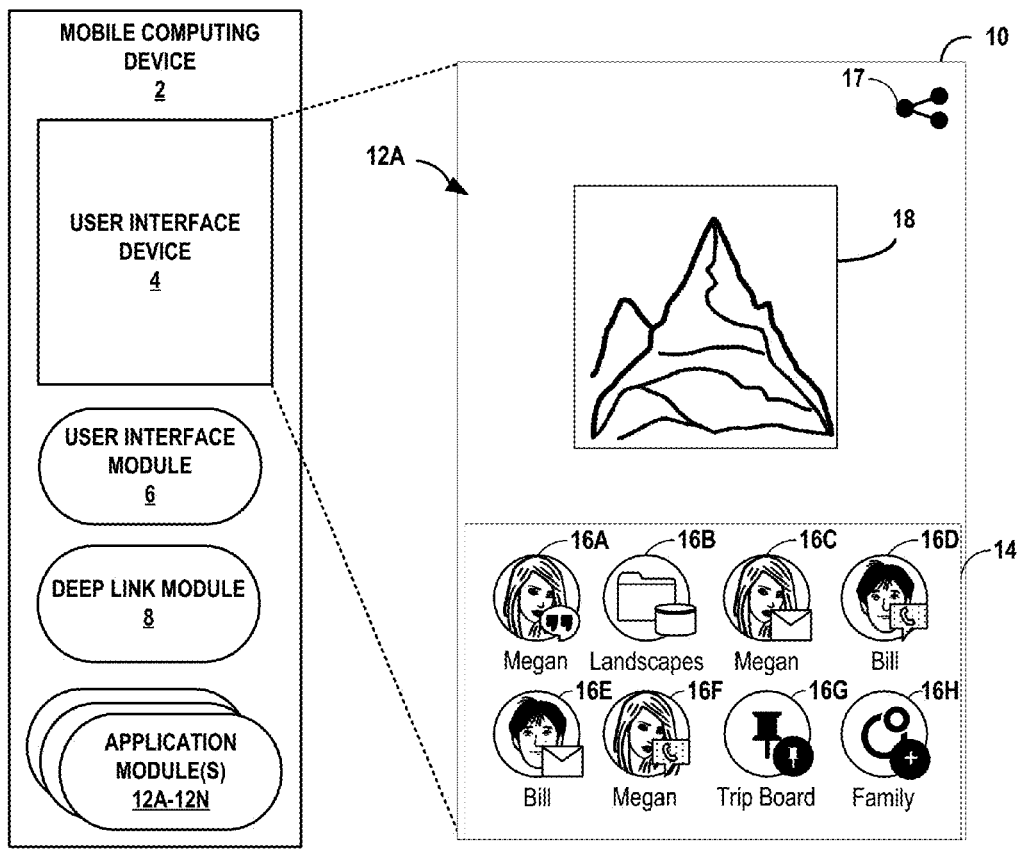
FIG. 1 is a conceptual diagram illustrating an example computing device configured to perform exemplary techniques for dynamically deep linking to targets within applications, in accordance with one or more aspects of the present disclosure.

In general, aspects of the present disclosure are directed to techniques for dynamically determining relevant deep links to targets of applications running on a computing device in response to a foreground application broadcasting an indication of an action to be performed that may be serviced by another application running on the computing device. The deep links to targets may be deep links to specific actions that applications may perform to service the indication of the action to be performed. Therefore, a deep link may be a link to a specific action that an application may perform to service the indication of the action to be performed, and may be a link to a specific action that an application may perform to act upon a piece of data that is shared from the foreground application that broadcasts the indication of the action nto be performed.

An application running on a computing device may broadcast an indication of an action to be performed to cause an operating system service on the computing device to launch another application which may perform the action indicated by the broadcasting application. Such an indication of an action to be performed may include not only the action to be performed but may also include the data to be acted upon For example, the application may broadcast an intent to share an image file. The intent to share an image file may include not only the action to be performed, which is to share an image file, but may also include the image file to be shared. The broadcasting of intent to share an image file from an application may cause the computing device to launch another application on the computing device which may receive the image file and share the image file to service the broadcasted intent.

Applications may include manifest files that declare actions to be performed that the application may service. For example, applications such as messaging applications, social media applications, and the like may declare in their respective manifests the ability to service an intent to share an image file, as well as the actions it can take to service the intent. In response to an application broadcasting an intent to share an image file, the computing device may determine, based at least in part on the manifests of applications on the computing device, applications that may service the intent to share the image file, and may enable a user to select an application to service the intent. In the example of an e-mail application that services the intent to share an image file, the manifest of the e-mail application may declare that the e-mail application may service the intent to share an image file by composing an e-mail that includes the image file to be shared as an attachment.

An application statically declares, in its manifest, activities that the application may perform to service the indications of actions to be performed. An activity of an application may be an application component that provides a screen with which users can interact to perform an action. For example, an activity of an e-mail application may be a compose e-mail screen of the e-mail application, and the manifest of the e-mail application may declare that the e-mail application may launch the compose e-mail activity to service an intent to share an image file.

However, an application may not declare, in its manifest, deep links to activities that the application may perform to service the indications of actions to be performed. In the example of the e-mail application, the manifest may not be able to declare a compose e-mail activity that specifies a particular recipient for the e-mail message. Due to the static nature of manifests, a manifest may not be able to determine which recipients would be particular relevant when the e-mail application receives an indication of an action to be performed.

Accordingly, aspects of the present disclosure include techniques for dynamically determining relevant actions that applications may perform to service a broadcasted intent to perform an action in response to such a broadcasted intent. A computing device may receive from a first application executing on at least one processor an indication of an action to be performed. The computing device may determine, based on at least the indication of the action to be performed, a plurality of deep links to a plurality of actions performable by a plurality of applications. The computing device may select a subset of deep links from the plurality of deep links. The computing device may output for display a graphical user interface including an indication of each deep link from the subset of deep links. The computing device may receive an indication of a user input, the user input corresponding to a selection of one of the deep links from the subset of deep links. A second application executing on the at least one processor may perform an action linked to by the selected deep link.

FIG. 1 is a conceptual diagram illustrating an example computing device configured to perform exemplary techniques for dynamically deep linking to targets within application, in accordance with one or more aspects of the present disclosure. As shown in FIG. 1, computing device 2 may include, but is not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 2 may include stationary computing devices such as desktop computers, servers, mainframes, etc. Computing device 2, in some examples, may include user interface (UI) device 4, UI device module 6, deep link module 8, and application modules 12A-12N ("applications 12"). Other examples of computing device 2 that implement techniques of this disclosure may include additional components not shown in FIG. 1.

UI device 4 of computing device 2 may function as an input device for computing device 2 and as an output device. For instance, UI device 4 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UI device 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 2.

UI device 4 of computing device 2 may include a presence-sensitive screen that may receive tactile user input from a user of computing device 2. UI device 4 may receive the tactile user input by detecting one or more taps and/or gestures from a user of computing device 2 (e.g., the user touching or pointing to one or more locations of UI device 4 with a finger or a stylus pen). The presence-sensitive screen of UI device 4 may present output to a user. UI device 4 may present the output as a user interface (e.g., graphical user interface (GUI) 10), which may be related to functionality provided by computing device 2. For example, UI device 4 may present various functions and applications executing on computing device 2 such as an electronic message application, a map application, etc.

Computing device 2 may include user interface ("UP") module 6 and deep link module 8. Modules 6 and 8 may perform operations described herein using software, hardware, or a mixture of both hardware and software residing in and executing on computing device 2. Computing device 2 may execute modules 6 and 8 with multiple processors. Computing device 2 may execute modules 6 and 8 as a virtual machine executing on underlying hardware. Deep link module 8 may be an operating system-level service that runs in the background of computing device 8 which may enable inter-application communications between applications of applications 12. Applications 12 may include a text application, photo viewer, social networking service application, video application, email application, word processor, spreadsheet, web browser, multimedia player, server application, image capture application, audio application, and the like.

As shown in FIG. 1, GUI 10 may include a user interface that enables a user to interact with computing device 2. Application 12A, which is running in the foreground in the example shown in FIG. 1, may cause UID 4 to display GUI 10. GUI 10 may include graphical content, such as text, images, videos, user interface elements (e.g., buttons, menus, etc.) or any other visually displayable graphical object. The user may interact with GUI 10 via UI device 4 to interact with application 12A being presented by GUI 10.

UI device module 6 may be implemented in various ways. For example, UI device module 6 may be implemented as a downloadable or pre-installed application or "app." In another example, UI device module 6 may be implemented as part of a hardware unit of computing device 2. In another example, UI device module 6 may be implemented as part of an operating system of computing device 2. In some instances, portions of the functionality of UI device module 6 or any other module described in this disclosure may be implemented across any combination of an application, hardware unit, and operating system.

UI device module 6 may interpret inputs detected at UID 4 (e.g., as a user provides one or more gestures at a location of UID 4 at which GUI 10 or another example user interface is displayed). UI module 6 may relay information about the inputs detected at UID 4 to one or more associated platforms, operating systems, applications, and/or services executing at computing device 2 to cause computing device 2 to perform a function. UI module 6 may also receive information and instructions from one or more associated platforms, operating systems, applications, and/or services executing at computing device 2 (e.g., deep link module 8 and applications 12) for generating GUI 10. In addition, UI device module 6 may act as an intermediary between the one or more associated platforms, operating systems, applications, and/or services executing at computing device 2 and various output devices of computing device 2 (e.g., speakers, LED indicators, vibrators, etc.) to produce output (e.g., graphical, audible, tactile, etc.) with computing device 2.

For instance, user interface 10 is one example graphical user interface for presenting suggested deep link targets sheet 14 which may include deep link targets 16A-16H. UI device module 6 may receive, as input from deep link module 8, graphical information (e.g., text data, images data, etc.) of deep link targets 16A-16H. Additionally, UI device module 6 may receive instructions associated with the graphical information from deep link module 8 for presenting the graphical information as one of deep link targets 16A-16H within user interface 10. Based on the graphical information and the instructions received from deep link module 8, UI device module 6 may cause UID 4 to present suggested deep link targets sheet 14 that includes deep link targets 16A-16H within GUI 10 to indicate to a user of computing device 2 of deep link targets 16A-16H that may be selected.

A user may interact with an application (e.g., application 12A) currently executing at mobile computing device 2 using GUI 10 via UI device 4 to activate functionality of application 12A (e.g., by selecting a UI element of the application presented in GUI 10) such that application 12A may pass, to deep link module 8, an indication of an action to be performed. In some examples, the indication of an action to be performed may be referred to as an intent. In some examples, the indication of an action to be performed may be an indication of an intent by application 12A to invoke an action that is to be performed by a different one of applications 12, an intent by application 12A to share a piece of data, such as image 18, an intent by application 12A to receive data from an external application, an intent by application 12A for an external application to apply an image filter to image 18, and the like.

Rather than directing the indication of the action to be performed to another specific application, application 12A may direct the indication of an action to be performed to deep link module 8, which may be an operating system-level service. Responsive to receiving the indication of an action to be performed from application 12A, deep link module 8 may not only determine the applications that may fulfill the action to be performed but also determine the actions that applications may perform to fulfill application 12A's action to be performed. In this way, deep link module 8 acts as an intermediary between various applications 12 such that application 12A itself may not determine the actions that applications may perform to fulfill application 12A's action to be performed, nor directly communicate with any other applications which may perform the actions to fulfill application 12A's action to be performed.

In one example, GUI 10 may include image 18 and user element 17, which, if selected, may enable application 12A to pass, to deep link module 8, an indication of an action to be performed. Because GUI 10 includes image 18, the indication of an action to be performed may be associated with image 18. For example, the indication of the action to be performed may include information about image 18 (e.g., the file type of image 18, the amount of space required to store image 18, the time and date at which image 18 was taken, the geographic location at which image 18 was taken, the current location of computing device 2, textual or graphical tags associated with image 18, object recognition data associated with image 18, etc.). The indication of an action to be performed, in the example of FIG. 1, may also include an indication of an intent for application 12A to share image 18 with another application of applications 12.

In response to receiving the indication of an action to be performed from application 12A, deep link module 8 may determine, based on at least the indication of the action to be performed received from application 12A, a plurality of deep links to a plurality of actions performable by a plurality of applications of applications 12 besides application 12A (e.g., applications 12B-12N). For example, if the indication of the action to be performed include an indication of an intent for application 12A to share image 18 with another application of applications 12, then deep link module 8 may deep link into a plurality of actions performable by applications which may act upon image 18, such as actions to send the image to a recipient, actions to post image 18 to a social media board, actions to save image 18 to the cloud, and the like.

A deep link to an action to be performed by an application may be referred to as a deep link target. A deep link target may not merely be a link to a specific application or a specific screen or activity of the application. Instead, the deep link target may be a link to a specific action that can be performed by the application, such as sending an e-mail to a specific recipient, sending a message to a specific recipient, saving a file to a directory to a recipient, and the like. Other examples of deep link targets may include sharing, by the associated application, of a specific file to application 12A, applying a specific filter, by the associated application, to image 18 displayed by application 12A, and the like. In this way, if the indication of an action to be performed includes at least indication of an intent for the application to share image 18 with another application of applications 12 as well as information about image 18 that is to be shared, a deep link target may not merely be an application to which application 12A can share image 18, but may be a specific action that an associated application can take on image 18.

In the example of FIG. 1, the indication of an action to be performed includes at least indication of an intent for the application to share image 18 with another application of applications 12 as well as information about image 18 that is to be shared. Deep link module 8 may receive the indication of the action be performed and may, based on the indication of the action to be performed, determine actions that may be performed on the image 18 by applications of applications 12 besides application 12A.

Each application of applications 12 other than the application that sent the indication of the action be performed may provide, to deep link module 8, an indication of whether each application supports deep linking and, if the application supports deep linking, whether the application has one or more actions which may be deep linked to and which supports the action to be performed. For example, each application may specify the types of indications of actions to be performed that the respective application responds to. For example, each application may be associated with a manifest that lists the types of indications of actions to be performed that the respective application responds to. In addition, the manifest for each application may indicate whether the associated application supports deep linking to actions that the associated application may perform.

In the example of FIG. 1, given the indication of an action to be performed that includes indication of an intent for application 12A to share image 18 with another application of applications 12 as well as information about image 18 that is to be shared, applications may each specify whether the respective application responds to the intent to share image 18, and each application that responds to the intent to share image 18 may further specify whether the respective application supports deep linking to actions that it may perform in response to the intent to share image 18.

Deep link module 8 may further provide information regarding the types of deep link targets to return from applications that responds to the indication of an action to be performed, such that applications may only return actions that can act upon the indication of an action to be performed. In the example of FIG. 1, deep link module 8 may request that a messaging application returns deep link targets that can act upon image 18, so that the messaging application may, in response, return actions that include sending an internet message or a multimedia message that includes image 18, but refrain from returning actions that include sending a text message because sending a text message may not support acting upon (e.g., sending to a recipient) image 18.

Each application 12 that responds to the indication of an action to be performed and that supports deep linking to actions that the particular application 12 may, in response to the indication of the action to be performed, dynamically determine the actions the particular application 12 may perform the indicated action to be performed and determine a weighing or ranking of the actions the application may perform in response to the indication of the action to be performed. That is, the particular application 12 may dynamically determine such actions rather than requiring the actions to be statically compiled into the particular application or statically provided by the particular application. Such weighing or ranking may be based on any relevant metric, such as app usage patterns such as the most recently performed action, the most frequently performed action over a period of time, and the like. In the example of FIG. 1, given the indication of an action to be performed that includes indication of an intent for application 12A to share image 18 with another application as well as information about image 18 that is to be shared by application 12A, an e-mail application may determine that it may perform the action of sending image 18 as an e-mail attachment to a variety of different recipients. As such, the e-mail application may provide to deep link module 8 links to actions of sending an e-mail attached with image 18 to one or more recipients. The e-mail application may perform a ranking of recipients to which the user of computing device 2 may be most likely to send image 18 via e-mail. Such a ranking may be based at least in part on usage statistics of the e-mail program, such as determining the recipients that the user most frequently e-mails over the life of the e-mail application, the recipient that the user last e-mailed, the recipient to which the user most frequently e-mailed images in the last day, and the like.

In another example, a cloud storage application may determine a ranking of directories and/or folders to which the user would most likely upload image 18. Such a ranking may be based at least in part on usage statistics of the cloud storage application, such as determining the directories and/or folders to which the user most frequently uploads images, determining the directories and/or folders to which the user most recently uploaded a file, and the like.

Applications 12 may provide an indication of the deep links to actions which may be performed by the respective application 12 as well as a ranking of the deep links to deep link module 8. Deep link module 8 may determine, based on at least the indication of the action to be performed, a subset of deep links from the plurality of deep links. For example, given the deep links to actions performable by applications 12 that are responsive to the indication of the action to be performed, deep link module 8 may perform a weighing of those deep links to select a subset of those deep links that deep link module 8 determines to be most relevant to the indication of the action to be performed received from application 12A. Deep link module 8 may perform the weighing of deep links based at least in part on the ranking of the deep links performed by applications 12 as well as usage statistics of the applications. For example, deep link module 8 may determine that deep links of an application (e.g., application 12N) are relatively more relevant if the usage statistics show that application 12N is a highly used application on computing device 2 or that the application is the most recently used application on computing device 2.

Computing device 2 may output, for display, a graphical user interface including an indication of each deep link from the subset of deep links. As shown in FIG. 1, deep link module 8 may cause UID 4 to display, within GUI 10, suggested deep link targets sheet 14 that includes deep link targets 16A-16H ("deep link targets 16"). Each deep link target of deep link targets 16 may be a UI element that represents a deep link from the subset of deep links selected by deep link module 8, where the deep link is a deep link to an action performable by an application 12 other than application 12A determined, by deep link module 8, to be more relevant to the indication of the action to be performed received from application 12A than other deep links. Each deep link target of deep link targets 16 may also provide an indication of an action to be performed by the deep link target. For example, deep link target 16A may be a deep link to an action which may be performed by an associated internet messaging application to send image 18 to recipient Megan as an internet message. As shown in FIG. 1, the graphical representation of deep link target 16A may include an image that identifies the recipient of image 18 as well as the type of application and/or messaging service that performs the sending of image 18 to recipient Megan.

Deep link target 16B may be a deep link to an action which may be performed by an associated cloud storage application of uploading image 18 to the Landscapes folder in the cloud for the user's cloud storage account. As shown in FIG. 1, the graphical representation of deep link target 16B may include an image that identifies the target location (e.g., the Landscapes folder) to which image 18 is uploaded as well as the cloud storage operation that performs the uploading of image 18.

Deep link target 16C may be a deep link to an action which may be performed by an associated e-mail application of sending an e-mail to recipient Megan that includes image 18 as an attachment. As shown in FIG. 1, the graphical representation of deep link target 16C may include an image that identifies the recipient of image 18 as well as the e-mail application that performs the sending of image 18 to recipient Megan.

Deep link target 16D may be a deep link to an action which may be performed by an associated messaging application to send image 18 to recipient Bill as a multimedia message. As shown in FIG. 1, the graphical representation of deep link target 16D may include an image that identifies the recipient of image 18 as well as the messaging application that performs the sending of image 18 to recipient Bill.

Deep link target 16E may be a deep link to an action which may be performed by an associated e-mail application of sending an e-mail to recipient Bill that includes image 18 as an attachment. As shown in FIG. 1, the graphical representation of deep link target 16E may include an image that identifies the recipient of image 18 as well as the e-mail application that performs the sending of image 18 to recipient Bill.

Deep link target 16F may be a deep link to an action which may be performed by an associated messaging application to send image 18 to recipient Megan as a multimedia message. As shown in FIG. 1, the graphical representation of deep link target 16F may include an image that identifies the recipient of image 18 as well as the messaging application that performs the sending of image 18 to recipient Megan.

Deep link target 16G may be a deep link to an action which may be performed by an associated image sharing application to post image 18 to a Trip Board section of an image sharing website. As shown in FIG. 1, the graphical representation of deep link target 16G may include an image that identifies the target section of the image sharing website to which the application posts image 18 as well as the image sharing application that performs the action of posting image 18.

Deep link target 16H may be a deep link to an action which may be performed by an associated social media application to post image 18 to a Family social sharing group of the user's social media account. As shown in FIG. 1, the graphical representation of deep link target 16H may include an image that identifies the target social sharing group of the user's social sharing website to which the application posts image 18 as well as the social media application that performs the action of posting image 18.

UI device 4 may detect a user input corresponding to a selection of one of deep link targets 16, which, as discussed above, are from the subset of deep links. Responsive to receiving the selection of a deep link target, the application associated with the selected deep link target may perform the action linked to by the selected deep link target. For example, if the user selects deep link target 16A, the associated internet messaging application may perform the associated action of sending, from the user's internet messaging account, image 18 to recipient Megan as an internet message. If the user selects deep link target 16B, the associated cloud storage application may perform the associated action of uploading image 18 to the Landscapes folder in the cloud for the user's cloud storage account. If the user selects deep link target 16C, the associated e-mail application may perform the associated action of sending an e-mail from the user's e-mail account to recipient Megan that includes image 18 as an attachment. If the user selects deep link target 16D, the associated messaging application may perform the associated action of sending image 18 from the user's messaging account to recipient Bill as a multimedia message. If the user selects deep link target 16E, the associated e-mail application may perform the associated action of sending an e-mail from the user's e-mail account to recipient Bill that includes image 18 as an attachment. If the user selects deep link target 16F, the associated messaging application may perform the associated action of sending image 18 from the user's messaging account to recipient Megan as a multimedia message. If the user selects deep link target 16G, the associated image sharing application may perform the associated action of posting image 18 to a Trip Board section of an image sharing website. If the user selects deep link target 16H, the associated social media application may perform the associated action of posting image 18 to a Family social sharing group of the user's social media account.

The indication of an action to be performed may include indications other than an indication of an intent for an application to share an image with another application. For example, the indication of an action to be performed may include an indication of an intent for an application to receive data from another application. In this example, applications may dynamically determine files it may be able to share with the application that provided the intent to receive data from another application, and may generate deep links to share those files with the application that provided the intent to receive data from another application. If a deep link to share a specific file is selected, the associated application may share the specific file with the application that provided the intent to receive data. The indication of an action to be performed may also include any other suitable indication of an intent for an application to perform any action or any other suitable indication of an intent for an application to cause deep link module 8 to determine deep links to any suitable actions which may be performed by other applications.

In instances in which deep link module 8 my collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by computing device 2 or other computing devices.

Figure 2:
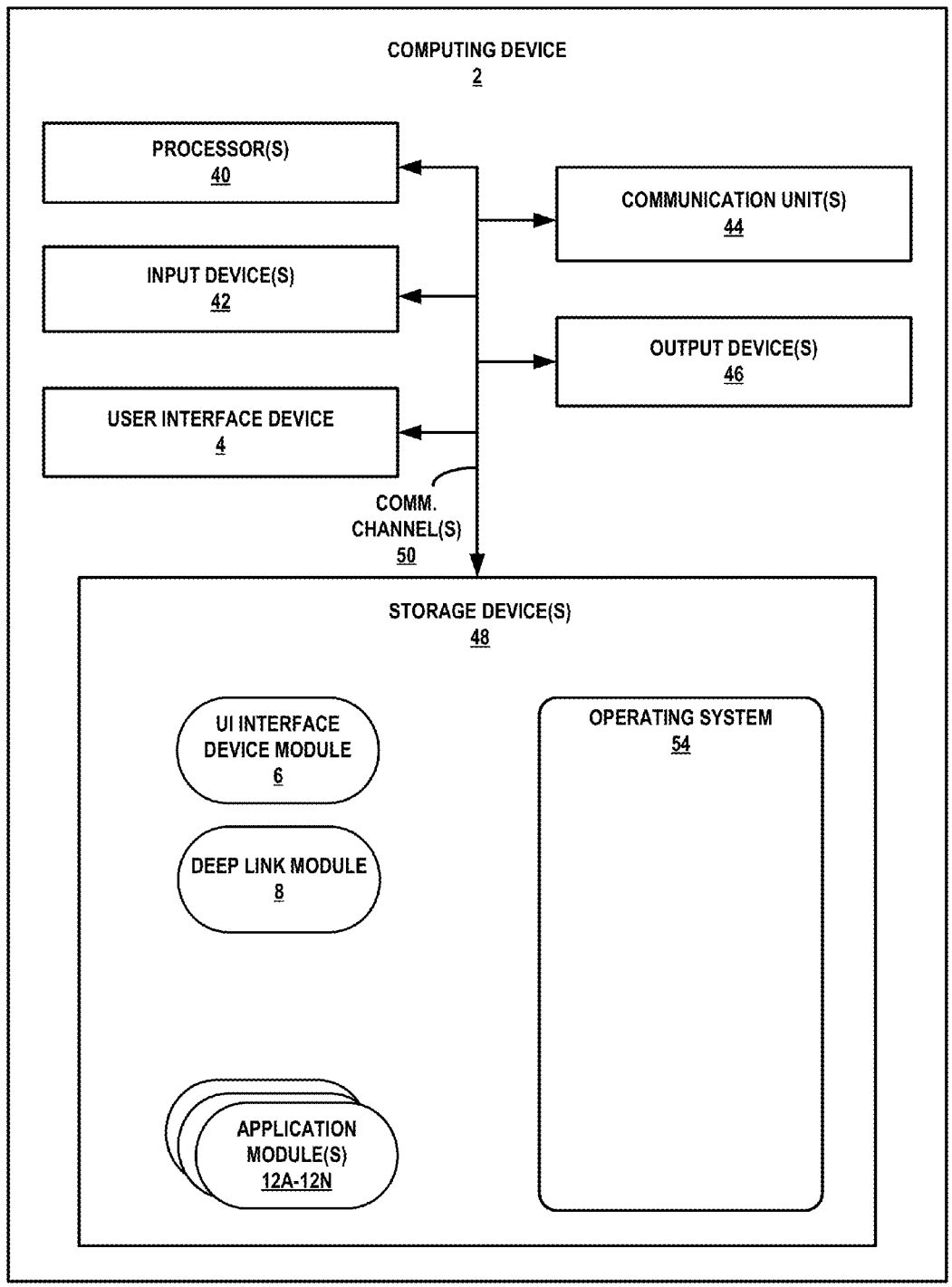
FIG. 2 is a block diagram illustrating the example computing device of FIG. 1 in further detail.

FIG. 2 is a block diagram illustrating the example computing device of FIG. 1 in further detail. Computing device 2 of FIG. 2 is described below within the context of computing device 2 of FIG. 1. FIG. 2 illustrates only one particular example of computing device 2 of system 1, and many other examples of computing device 2 may be used in other instances and may include a subset of the components included in example computing device 2 or may include additional components not shown in FIG. 2.

As shown in the example of FIG. 2, computing device 2 includes user interface device 4 ("UID 4"), one or more processors 40, one or more input devices 42, one or more communication units 44, one or more output devices 46, and one or more storage devices 48. Storage devices 48 of computing device 2 also include UI device module 6, deep link module 8, application modules 12A-12N ("application modules 12"), and operating system 54. Communication channels 50 may interconnect each of the components 4, 6, 8, 12, 40, 42, 44, 46, 48, and 54 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display, touch-sensitive screen, mouse, keyboard, voice responsive system, video camera, microphone or any other type of device for detecting input from a human or machine.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 2 may communicate with external devices via one or more networks by transmitting and/or receiving network signals on the one or more networks. For example, computing device 2 may use communication unit 44 to send and receive data to and from information server system 60 of FIG. 1. Computing device 2 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches (about 5 centimeters) or less of the screen. The presence-sensitive input device may determine a location (e.g., an (x, y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 4 presents a user interface (such as user interface 10 of FIG. 1).

While illustrated as an internal component of computing device 2, UID 4 also represents and external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more storage devices 48 within computing device 2 may store information for processing during operation of computing device 2 (e.g., computing device 2 may store data accessed by modules 6, 8, and 12 during execution at computing device 2). In some examples, storage device 48 is a temporary memory, meaning that a primary purpose of storage device 48 is not long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, and 12.

One or more processors 40 may implement functionality and/or execute instructions within computing device 2. For example, processors 40 on computing device 2 may receive and execute instructions stored by storage devices 48 that execute the functionality of UI device module 6, notification client module 8, application modules 12, and operating system 54. These instructions executed by processors 40 may cause computing device 2 to store information, within storage devices 48 during program execution. Processors 40 may execute instructions of modules 6, 8, and 12 to cause UI device 4 to present GUI 10. That is, modules 6, 8, and 12 may be operable by processors 40 to perform various actions or functions of computing device 2 as described in this application.

Computing device 2 may be part of a mobile communications network. Computing device 2 may exchange data with a server or cloud computing system over the mobile communications network via one or more communication units 44. The server or cloud computing system may perform some or all of the techniques and operations related to modules 6, 8, and 12 described herein. In other words, some or all of the techniques and operations related to modules 6, 8, and 12 can be implemented locally at computing device 2, for instance, a mobile phone, and some or all of the techniques and operations may be performed remotely via a server connected to the mobile communications network that exchanges data with computing device 2. In other words, while shown in FIG. 2 as being included within computing device 2, modules 6, 8, and 12 may be a part of a remote computing system and may execute as one or more remote computing services, such as one or more services provided by a cloud and/or cluster based computing system.

Operating system 54 may execute to cause computing device 2 to perform various functions to manage hardware resources of computing device 2 and to provide various common services for other computer programs. Application modules 12 may cause computing device 10 to provide various applications (e.g., "apps").

Deep link module 8 may execute to receive from a first application 12A an indication of an action to be performed. Deep link module 8 may determine, based on at least the indication of the action to be performed, a plurality of deep links to a plurality of actions performable by a plurality of applications. Deep link module 8 may select a subset of deep links from the plurality of deep links. Deep link module 8 may output for display by UI device 4 a graphical user interface including an indication of each deep link from the subset of deep links. UI device 4 may receive an indication of a user input, the user input corresponding to a selection of one of the deep links from the subset of deep links. A second application linked to by the selected deep link may perform an action linked to by the selected deep link.

Figure 3:
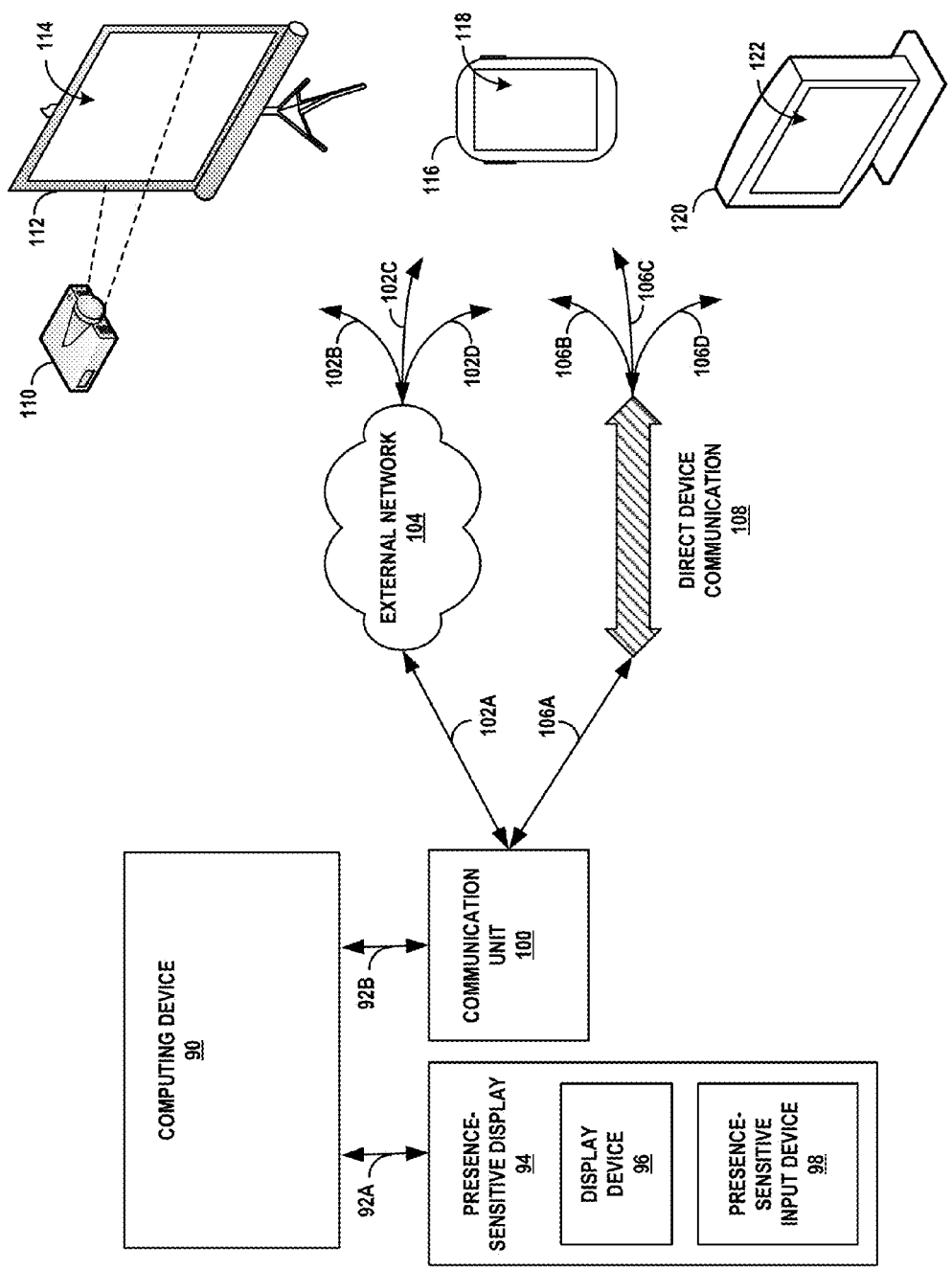
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 90, presence-sensitive display 94, communication unit 100, projector 110, projector screen 112, mobile device 116, and visual display device 120. Although shown for purposes of example in FIGS. 1 and 2 as a stand-alone computing device 2, a computing device such as computing device 90 may, generally, be any component or system that includes a processor or other suitable computing environment for executing software instructions and, for example, need not include a presence-sensitive display.

As shown in the example of FIG. 3, computing device 90 may be a processor that includes functionality as described with respect to processor 40 in FIG. 2. In such examples, computing device 90 may be operatively coupled to presence-sensitive display 94 by a communication channel 92A, which may be a system bus or other suitable connection. Computing device 90 may also be operatively coupled to communication unit 100, further described below, by a communication channel 92B, which may also be a system bus or other suitable connection. Although shown separately as an example in FIG. 3, computing device 90 may be operatively coupled to presence-sensitive display 94 and communication unit 100 by any number of one or more communication channels.

In other examples, such as illustrated previously by computing device 2 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 94 may include display device 96 and presence-sensitive input device 98. Display device 96 may, for example, receive data from computing device 90 and display the graphical content. In some examples, presence-sensitive input device 98 may determine one or more inputs (e.g., continuous gestures, multi-touch gestures, single-touch gestures, etc.) at presence-sensitive display 94 using capacitive, inductive, and/or optical recognition techniques and send indications of such input to computing device 90 using communication channel 92A. In some examples, presence-sensitive input device 98 may be physically positioned on top of display device 96 such that, when a user positions an input unit over a graphical element displayed by display device 96, the location at which presence-sensitive input device 98 corresponds to the location of display device 96 at which the graphical element is displayed. In other examples, presence-sensitive input device 98 may be positioned physically apart from display device 96, and locations of presence-sensitive input device 98 may correspond to locations of display device 96, such that input can be made at presence-sensitive input device 98 for interacting with graphical elements displayed at corresponding locations of display device 96.

As shown in FIG. 3, computing device 90 may also include and/or be operatively coupled with communication unit 100. Communication unit 100 may include functionality of communication unit 44 as described in FIG. 2. Examples of communication unit 100 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 90 may also include and/or be operatively coupled with one or more other devices, e.g., input devices, output devices, memory, storage devices, etc. that are not shown in FIG. 3 for purposes of brevity and illustration.

FIG. 3 also illustrates a projector 110 and projector screen 112. Other such examples of projection devices may include electronic whiteboards, holographic display devices, and any other suitable devices for displaying graphical content. Projector 110 and projector screen 112 may include one or more communication units that enable the respective devices to communicate with computing device 90. In some examples, the one or more communication units may enable communication between projector 110 and projector screen 112. Projector 110 may receive data from computing device 90 that includes graphical content. Projector 110, in response to receiving the data, may project the graphical content onto projector screen 112. In some examples, projector 110 may determine one or more inputs (e.g., continuous gestures, multi-touch gestures, single-touch gestures, etc.) at projector screen 112 using optical recognition or other suitable techniques and send indications of such input using one or more communication units to computing device 90. In such examples, projector screen 112 may be unnecessary, and projector 110 may project graphical content on any suitable medium and detect one or more user inputs using optical recognition or other such suitable techniques.

Projector screen 112, in some examples, may include a presence-sensitive display 114. Presence-sensitive display 114 may include a subset of functionality or all of the functionality of UI device 4 as described in this disclosure. In some examples, presence-sensitive display 114 may include additional functionality. Projector screen 112 (e.g., an electronic display of computing eye glasses) may receive data from computing device 90 and display the graphical content. In some examples, presence-sensitive display 114 may determine one or more inputs (e.g., continuous gestures, multi-touch gestures, single-touch gestures, etc.) at projector screen 112 using capacitive, inductive, and/or optical recognition techniques and send indications of such input using one or more communication units to computing device 90.

FIG. 3 also illustrates mobile device 116 and visual display device 120. Mobile device 116 and visual display device 120 may each include computing and connectivity capabilities. Examples of mobile device 116 may include e-reader devices, convertible notebook devices, hybrid slate devices, computerized watches, computerized eyeglasses, etc. Examples of visual display device 120 may include other semi-stationary devices such as televisions, computer monitors, etc. As shown in FIG. 3, mobile device 116 may include a presence-sensitive display 118. Visual display device 120 may include a presence-sensitive display 122. Presence-sensitive displays 118 and 122 may include a subset of functionality or all of the functionality of UID 4 as described in this disclosure. In some examples, presence-sensitive displays 118 and 122 may include additional functionality. In any case, presence-sensitive display 122, for example, may receive data from computing device 90 and display the graphical content. In some examples, presence-sensitive display 112 may determine one or more inputs (e.g., continuous gestures, multi-touch gestures, single-touch gestures, etc.) at projector screen using capacitive, inductive, and/or optical recognition techniques and send indications of such input using one or more communication units to computing device 90.

As described above, in some examples, computing device 90 may output graphical content for display at presence-sensitive display 94 that is coupled to computing device 90 by a system bus or other suitable communication channel. Computing device 90 may also output graphical content for display at one or more remote devices, such as projector 110, projector screen 112, mobile device 116, and visual display device 120. For instance, computing device 90 may execute one or more instructions to generate and/or modify graphical content in accordance with techniques of the present disclosure. Computing device 90 may output the data that includes the graphical content to a communication unit of computing device 90, such as communication unit 100. Communication unit 100 may send the data to one or more of the remote devices, such as projector 110, projector screen 112, mobile device 116, and/or visual display device 120. In this way, computing device 90 may output the graphical content for display at one or more of the remote devices. In some examples, one or more of the remote devices may output the graphical content at a presence-sensitive display that is included in and/or operatively coupled to the respective remote devices.

In some examples, computing device 90 may not output graphical content at presence-sensitive display 94 that is operatively coupled to computing device 90. In other examples, computing device 90 may output graphical content for display at both a presence-sensitive display 94 that is coupled to computing device 90 by communication channel 92A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 90 and output for display at presence-sensitive display 94 may be different than graphical content display output for display at one or more remote devices.

Computing device 90 may send and receive data using any suitable communication techniques. For example, computing device 90 may be operatively coupled to external network 104 using network link 102A. Each of the remote devices illustrated in FIG. 3 may be operatively coupled to network external network 104 by one of respective network links 108B, 108C, and 108D. External network 104 may include network hubs, network switches, network routers, etc., that are operatively inter-coupled thereby providing for the exchange of information between computing device 90 and the remote devices illustrated in FIG. 3. In some examples, network links 102A-102D may be Ethernet, ATM or other network connections. Such connections may be wireless and/or wired connections.

In some examples, computing device 90 may be operatively coupled to one or more of the remote devices included in FIG. 3 using direct device communication 108. Direct device communication 108 may include communications through which computing device 90 sends and receives data directly with a remote device, using wired or wireless communication. That is, in some examples of direct device communication 108, data sent by computing device 90 may not be forwarded by one or more additional devices before being received at the remote device, and vice-versa. Examples of direct device communication 108 may include Bluetooth, Near-Field Communication, Universal Serial Bus, Wi-Fi, infrared, etc. One or more of the remote devices illustrated in FIG. 3 may be operatively coupled with computing device 90 by communication links 106A-106D. In some examples, communication links 106A-106D may be connections using Bluetooth, Near-Field Communication, Universal Serial Bus, infrared, etc. Such connections may be wireless and/or wired connections.

In the example of FIG. 3, computing device 90 may output a GUI, such as GUI 10 illustrated in FIG. 1, for display by a display device (e.g., display device 96, presence-sensitive displays 114, 118, 122, etc.). For instance, computing device 90 may send data representing GUI 10 to communication unit 100. Communication unit 100 may send the data to visual display device 120 via external network 104. Visual display device 120 may cause presence-sensitive display 122 to output GUI 10.

In accordance with aspects of the present disclosure, a deep link module executing on computing device 90 may receive from a first application an indication of an action to be performed. The deep link module may determine, based on at least the indication of the action to be performed, a plurality of deep links to a plurality of actions performable by a plurality of applications. The deep link module may select a subset of deep links from the plurality of deep links. The deep link module may output for display by one or more of presence-sensitive display 94, projector 110, projector screen 112, mobile device 116, and visual display device 120 a graphical user interface including an indication of each deep link from the subset of deep links. One or more of presence-sensitive display 94, projector 110, projector screen 112, mobile device 116, and visual display device 120 may receive an indication of a user input, the user input corresponding to a selection of one of the deep links from the subset of deep links. A second application linked to by the selected deep link may perform an action linked to by the selected deep link.

Figure 4:
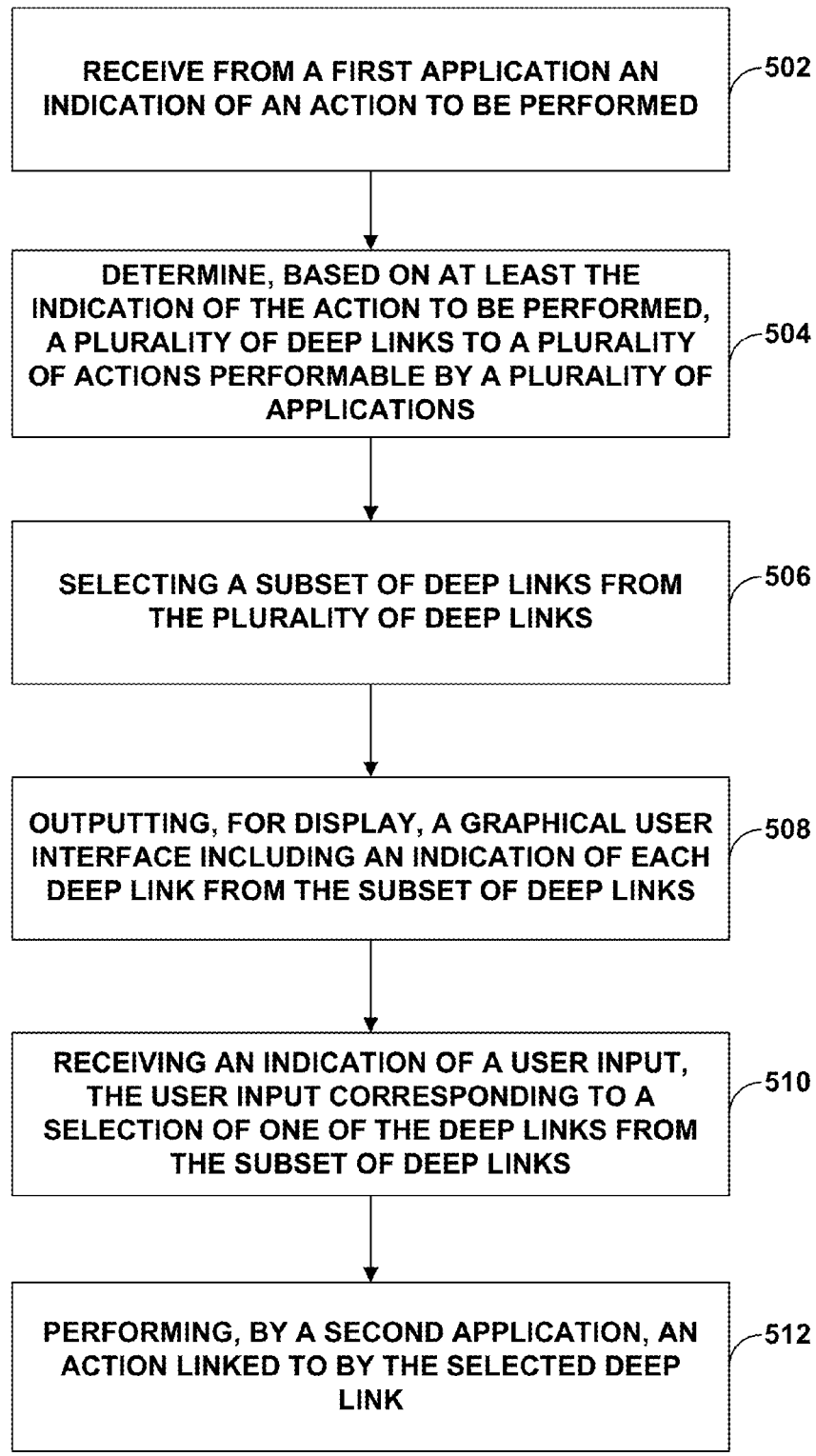
FIG. 4 is a flowchart illustrating an example mode of operation for dynamically deep linking to targets in accordance with one or more techniques of the present disclosure.

FIG. 4 is a flowchart illustrating an example mode of operation for dynamically deep linking to targets in accordance with one or more techniques of the present disclosure. As shown in FIG. 4, deep link module 8 may receive from a first application 12A an indication of an action to be performed (502). Deep link module 8 may determine, based on at least the indication of the action to be performed, a plurality of deep links to a plurality of actions performable by a plurality of applications (504). Deep link module 8 may select a subset of deep links from the plurality of deep links (506). Deep link module 8 may output for display by UI device 4 a graphical user interface including an indication of each deep link from the subset of deep links (508). UI device 4 may receive an indication of a user input, the user input corresponding to a selection of one of the deep links from the subset of deep links (510). A second application linked to by the selected deep link may perform an action linked to by the selected deep link (512).

In some examples, determining, based on at least the indication of the action to be performed, the plurality of deep links to the plurality of actions performable by the plurality of applications further comprises determining, based on at least the indication of the action to be performed, the plurality of applications that support deep linking. In some examples, determining, based on at least the indication of the action to be performed, the plurality of deep links to the plurality of actions performable by the plurality of applications further comprises dynamically determining, by the plurality of applications, the plurality of deep links to the plurality of actions performable by the plurality of application based at least in part on the indication of the action to be performed.

In some examples, dynamically determining, by the plurality of applications, the plurality of deep links to the plurality of actions performable by the plurality of application based at least in part on the indication of the action to be performed further comprises weighing, by each of the plurality of applications executing on the at least one processor, one or more deep links to one or more actions performable by the respective application of the plurality of applications. In some examples, selecting the subset of deep links from the plurality of deep links further comprises weighing, by the at least one processor, the plurality of deep links to the plurality of actions performable by the plurality of application based at least in part on the weighing, by each of the plurality of applications executing on the at least one processor, the one or more deep links to the one or more actions performable by the respective application of the plurality of applications and selecting, by the at least one processor, the subset of deep links from the plurality of deep links based at least in part on the weighing, by the at least one processor, of the plurality of deep links to the plurality of actions performable by the plurality of applications. In some examples, weighing the plurality of deep links to the plurality of actions performable by the plurality of application is further based at least in part on usage statistics of the plurality of applications.

In some examples, the indication of each deep link from the subset of deep links further comprises an indication of an action to be performed by each deep link from the subset of deep links. In some examples, the indication of an action to be performed comprises an indication to share data, and performing, by the second application, the action linked to by the selected deep link further comprises performing, by the second application, the action linked to by the selected deep link on the data shared by the first application.

In some examples, the indication of the action to be performed by each deep link from the subset of deep links comprises, for each deep link from the subset of deep links, an indication of a recipient of the data shared by the first operation, and performing, by the second application, the action linked to by the selected deep link on the object shared by the first application further comprises sending, by the second application, the data shared by the first application to the recipient. In some examples, the indication of an action to be performed comprises an indication of intent to receive data, the indication of the action to be performed by each deep link from the subset of deep links comprises, for each deep link from the subset of deep links, an indication of data to be shared from the second application linked to by the respective deep link, and performing, by the second application, the action linked to by the selected deep link further comprises sharing, by the second application, the data with the first application.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), central processing units (CPUs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   determining, by at least one processor and based on at least an indication of an action to be performed that is received from a first application, one or more deep links to one or more actions performable by one or more applications;
   outputting, by the at least one processor and for display, a user interface including an indication of each of the one or more deep links;
   receiving, by the at least one processor, an indication of a user input, the user input corresponding to a selection of one of the one or more deep links; and
   performing, by a second application executing on the at least one processor, an action associated with the selected deep link.

2. The method of claim 1, wherein determining, by the at least one processor and based on at least the indication of the action to be performed that is received from the first application, the one or more deep links to the one or more actions performable by the one or more applications further comprises:
   dynamically determining, by the one or more applications executing on the at least one processor, the one or more deep links to the one or more actions performable by the one or more application based at least in part on the indication of the action to be performed.

3. The method of claim 1, wherein the one or more deep links to the one or more actions performable by the one or more applications comprises a plurality of deep links to a plurality of actions performable by the one or more applications, further comprising:
   weighing, by the at least one processor, the plurality of deep links to the plurality of actions performable by the one or more applications, and
   selecting, by the at least one processor, the one or more deep links from the plurality of deep links based at least in part on the weighing.

4. The method of claim 3, wherein weighing, by the at least one processor, the plurality of deep links to the plurality of actions performable by the one or more applications is further based at least in part on usage statistics of the one or more applications.

5. The method of claim 1,
   wherein the indication of each of the one or more deep links further comprises an indication of an action to be performed by each of the one or more deep links.

6. The method of claim 5,
   wherein the indication of the action to be performed by each of the one or more deep links comprises, an indication by the first application to share data, and
   wherein performing, by the second application executing on the at least one processor, the action associated with the selected deep link further comprises performing, by the second application executing on the at least one processor, the action associated with the selected deep link on the data shared by the first application.

7. The method of claim 5,
   wherein the indication of the action to be performed by each of the one or more deep links comprises, for each of the one or more deep links, an indication of a recipient of data shared by the first application, and
   wherein performing, by the second application executing on the at least one processor, the action associated with the selected deep link comprises sending, by the second application executing on the at least one processor, the data shared by the first application to the recipient.

8. The method of claim 5,
   wherein the indication of the action to be performed by each of the one or more deep links comprises, for each of the one or more deep links, an indication of data to be shared from the second application, and
   wherein performing, by the second application executing on the at least one processor, the action associated with the selected deep link further comprises sharing, by the second application executing on the at least one processor, the data with the first application.

9. The method of claim 1, further comprising:
   determining, by the computing device, for each of the one or more applications, at least one type of indication of action to be performed that each respective application of the one or more applications responds to,
   wherein determining the one or more deep links is further based on the at least one type of indication of action that each respective application responds to.

10. The method of claim 9, wherein the at least one type of indication of action that each respective application responds to are defined by the respective applications of the one or more applications.

11. A computing device comprising:
    a memory configured to store a first application; and
    at least one processor configured to:
      determine, based on at least an indication of an action to be performed that is received from the first application stored in the memory, one or more deep links to one or more actions performable by one or more applications;
      output for display a user interface including an indication of each of the one or more deep links;
      receive an indication of a user input, the user input corresponding to a selection of one of the one or more deep links; and
      perform, by a second application executing on the at least one processor, an action linked to by the selected deep link.

12. The computing device of claim 11,
    wherein the at least one processor is further configured to dynamically determine, by the one or more applications executing on the at least one processor, the one or more deep links to the one or more actions performable by the one or more applications based at least in part on the indication of the action to be performed.

13. The computing device of claim 12, wherein the at least one processor is further configured to:

weigh a plurality of deep links to a plurality of actions performable by a plurality of applications; and select the one or more deep links from the plurality of deep links based at least in part on the weighing of the plurality of deep links to the plurality of actions performable by the plurality of applications.

14. The computing device of claim 13, wherein the at least one processor is further configured to:

weigh the plurality of deep links based at least in part on usage statistics of the one or more applications.

15. The computing device of claim 11, wherein the indication of each of the one or more deep links further comprises an indication of an action to be performed by each of the one or more deep links;

wherein the indication of the action to be performed by each of the one or more deep links comprises an indication by the first application to share data; and wherein the at least one processor is further configured to perform, by the second application executing on the at least one processor, the action associated with the selected deep link on the data shared by the first application.

16. The computing device of claim 11, wherein the indication of each of the one or more deep links further comprises an indication of an action to be performed by each of the one or more deep links;

wherein the indication of the action to be performed by each of the one or more deep links comprises, for each of the one or more deep links, an indication of a recipient of data shared by the first application, and wherein the at least one processor is further configured to send, by the second application executing on the at least one processor, the data shared by the first application to the recipient.

17. The computing device of claim 11, wherein the at least one processor is further configured to:

determine, for each of the one or more applications, at least one type of indication of action to be performed that each respective application of the one or more applications responds to, wherein determining the one or more deep links is further based on the at least one type of indication of action that each respective application responds to.

18. The computing device of claim 17, wherein the at least one type of indication of action that each respective application responds to are defined by the respective applications of the one or more applications.

19. A non-transitory computer readable medium encoded with instructions that, when executed, cause one or more processors of a computing device to:

determine, based on at least an indication of an action to be performed that is received from a first application, one or more deep links to one or more actions performable by one or more applications;

output for display a user interface including an indication of each of the one or more deep links;

receive an indication of a user input, the user input corresponding to a selection of one of the one or more deep links; and perform, by a second application, an action associated with the selected deep link.

20. The non-transitory computer readable medium of claim 19, wherein the instructions, when executed, further cause the one or more processors of the computing device to:

dynamically determine, by the one or more applications executing on the at least one processor, the one or more deep links to the one or more actions performable by the one or more application based at least in part on the indication of the action to be performed.

21. The non-transitory computer readable medium of claim 19, wherein the indication of each of the one or more deep links further comprises an indication of an action to be performed by each of the one or more deep links.

22. The non-transitory computer readable medium of claim 21, wherein the indication of the action to be performed by each of the one or more deep links comprises an indication to share data, and wherein the instructions, when executed, further cause the one or more processors of the computing device to perform the action associated with the selected deep link on the data shared by the first application.

23. The non-transitory computer readable medium of claim 21, wherein the indication of the action to be performed by each of the one or more deep links comprises, for each of the one or more deep links, an indication of a recipient of data shared by the first application, and wherein the instructions, when executed, further cause the one or more processors of the computing device to send, by the second application, the data shared by the first application to the recipient.

24. The non-transitory computer readable medium of claim 21, wherein the indication of the action to be performed by each of the one or more deep links comprises, for each of the one or more deep links, an indication of data to be shared from the second application, and wherein the instructions, when executed, further cause the one or more processors of the computing device to share, by the second application, the data with the first application.

25. The non-transitory computer readable medium of claim 19, wherein the instructions, when executed, further cause the one or more processors of the computing device to:

determine, for each of the one or more applications, at last one type of indication of action to be performed that each respective application of the one or more applications responds to, wherein determining the one or more deep links is further based on the at least one type of indication of action that each respective application responds to.

26. The non-transitory computer readable medium of claim 25, wherein the at least one type of indication of action that each respective application responds to are defined by the respective applications of the one or more applications.

* * * * *